United States Patent
Busby, Jr.

[15] 3,700,314
[45] Oct. 24, 1972

[54] VARIABLE LIGHT TRANSMITTING FILTER FOR CAMERAS

[72] Inventor: Edwin S. Busby, Jr., Menlo Park, Calif.

[73] Assignee: Ampex Corporation, Redwood City, Calif.

[22] Filed: April 7, 1971

[21] Appl. No.: 131,996

[52] U.S. Cl. ................350/314, 95/64 R, 95/64 D, 350/315
[51] Int. Cl. ............................................G02b 5/22
[58] Field of Search ......350/314, 315; 95/64 R, 64 D

[56] References Cited

UNITED STATES PATENTS

| | | |
|---|---|---|
| 3,584,558 | 6/1971 | Easterly ..................95/64 R |
| 3,006,265 | 10/1961 | La Rue ..................350/314 X |
| 3,035,503 | 5/1962 | Lee ..........................95/64 D |

*Primary Examiner*—David Schonberg
*Assistant Examiner*—Toby H. Kusmer
*Attorney*—Robert G. Clay

[57] ABSTRACT

A filter for permanent installation to extend the effective range of iris openings of a camera; the filter has light transmittance characteristics varying smoothly from low transmittance at the center to high transmittance at the periphery.

3 Claims, 2 Drawing Figures

Patented Oct. 24, 1972  3,700,314
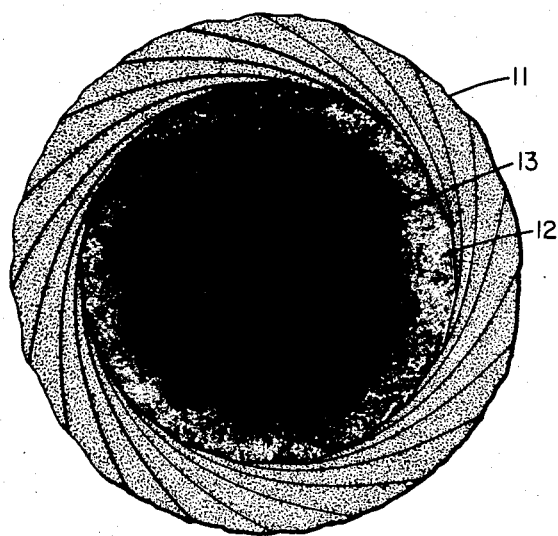
FIG_1
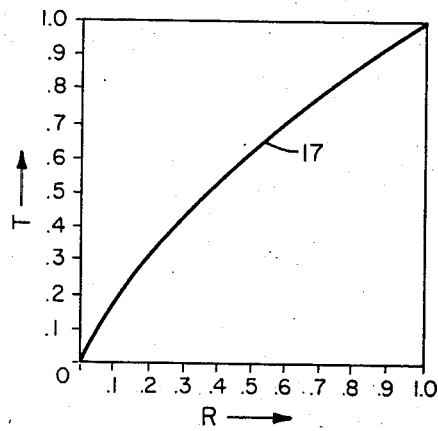
FIG_2
INVENTOR.
EDWIN S. BUSBY
BY Robert H. Clay
ATTORNEY

VARIABLE LIGHT TRANSMITTING FILTER FOR CAMERAS

BACKGROUND OF THE INVENTION

This invention relates to optical systems for cameras, and particularly to light filters therefor.

Previously in the television camera art, it has been difficult to deal with live scenes having widely varying brightness. As an illustrative example, suppose the camera is to be focused upon an indoor scene including a subject which then moves to the outdoors in bright sunlight. It will be understood that the range of input brightness that a given television system can accommodate is limited, and that the range of iris openings that can be built into a lens of given size is predetermined by mechanical limitations. The system is usually arranged so that the range of iris openings, from fully open to closed, does not cover the full range of input brightness i.e., from indoors to outdoors, but is chosen to permit good picture contrast only for darker scenes. To provide good contrast in brighter scenes, the prior art normally uses a system of individual light filters, each of which has a different transmittance. Working indoors without a filter then, an iris opening may be chosen to correspond only with the indoor scene illumination. When the subject moves outdoors, a dark filter is inserted into the optical system to permit the use of an attainable iris opening.

The difficulty with this prior art method of inserting light filters at discrete points in the brightness range is that the effect on the viewer is abrupt and disconcerting, and the iris must always be re-adjusted after the filter is inserted or removed.

Accordingly, it is an object of the present invention to provide a light filter for extending the iris opening range of a lens in a smooth and unobtrusive manner not noticeable by the viewer. Other objects and advantages will be made clear in connection with the following description.

SUMMARY OF THE INVENTION

A filter for permanent installation to extend the effective range of iris openings of a camera; the filter has light transmittance characteristics varying smoothly from low transmittance at the center to high transmittance at the periphery.

DESCRIPTION OF THE DRAWINGS

FIG. 1 is a broken-away view of an iris and filter system incorporating the invention; and FIG. 2 is a graph illustrating the construction of the invention.

DESCRIPTION OF THE PREFERRED EMBODIMENTS

Referring now to FIG. 1, there is shown in broken away detail an iris system 11 such as is typically used in television cameras. Set into the optical system and as closely as possible to the plane of the iris is a light filter 12 of varying transmittance. A dash lined circle 13 is superimposed on the drawing Figure to delineate a central zone 14 and a peripheral zone 16. The peripheral zone 16 may have uniformly the fullest transmission (expressed in percentage of light passed) that the filter is capable of, and the central zone 14 has a gaussian or an exponential distribution of transmittance varying radially from minimum value at the precise center of the filter to maximum value at the boundary 13, this maximum value being equal to that of the peripheral zone 16, so that the central zone 14 blends smoothly therewith.

With a filter as above described, the total transmittance with the iris fully open as shown can be established at a value such that the television picture tube gives a picture of satisfactory contrast when the scene being viewed by the camera is generally dark, i.e., dark background and dark objects, while yet the contrast is also satisfactory when the scene consists of bright objects and bright background, but with the iris in its most fully closed down position, exposing only the darkest central area of the portion 14. Thus the same effect can be created with only one filter, as is provided in the prior art by the use of several. Furthermore the transition from one filter condition to another is made smoothly and unobtrusively by means of the present filter, so that the monitor viewer is not disconcerted, and counteradaptive re-positioning of the iris with each filter change is no longer needed.

The variable-transmission portion 14 of the filter may be made in any of a number of suitable ways. An actual filter has been satisfactorily made by sputtering techniques, to fit a transmission curve similar to that of FIG. 2 described below. Other ways include the exposure of photographic film to light beams of varying cross-sectional intensities. A laser beam having a gaussian cross-sectional intensity distribution may be used for example. The illustration of FIG. 1 may be considered to be an actual example of a filter according to the invention if the drawing paper is held up to pass light. This illustration was produced by superimposing discrete rings of dotted illustrators' shading material of different dot densities, according to the curve of FIG. 2, and then photographing the composite through a defocused camera lens so as to diffuse and smooth out the transitions between rings.

As explained in part above, FIG. 2 shows an exemplary curve 17 plotted from the equation $T = R^{0.72}$, wherein the term $R$ is the radius of various points within the area 14 and the term $T$ represents the corresponding transmittances of such points. Such a relationship has been found to be satisfactory in actual practice, and many others may be possible.

What is claimed is:

1. A variable light-transmitting filter combination, comprising:
   a mask having a variable area aperture formed therein and defined in part by a camera type circumferentially expandable and contractable iris mechanism; and
   a semi-transparent filter element covering said aperture;
   said filter element having a smoothly varying transmittance characteristic from point to point thereof;
   wherein said transmittance characteristic of said filter varies from a point of minimum light transmittance at the center of said filter and iris and increases smoothly radially outwardly for at least a central portion of the filter.

2. The combination recited in claim 1, wherein the radially outwardly increasing portions of said filter varies in accordance with the equation $T = R^K$, in which $T$ is the transmittance expressed in percent of incident light passed, $R$ is the radius from the center of the filter, and $K$ is a chosen exponential value.

3. The combination recited in claim 2, wherein $K$ is equal to 0.72.

* * * * *